(12) United States Patent
Kobayashi (10) Patent No.: US 7,707,903 B2
(45) Date of Patent: May 4, 2010

(54) ACTUATOR EMPLOYING A STANDBY MECHANISM (75) Inventor: Yasuhiro Kobayashi, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 845 days.

(21) Appl. No.: 11/184,842

(22) Filed: Jul. 20, 2005

(65) Prior Publication Data
US 2006/0021458 A1 Feb. 2, 2006

(30) Foreign Application Priority Data
Jul. 27, 2004 (JP) .............................. 2004-218400

(51) Int. Cl.
F16H 19/04 (2006.01)
(52) U.S. Cl. .............................. 74/34; 74/425; 74/89.14
(58) Field of Classification Search .................. 74/425, 74/89.14, 89.17, 473.12, 335, 411, 405, 34; 180/248, 245, 247; 464/57, 59, 58; 251/77, 251/78
See application file for complete search history.

(56) References Cited

U.S. PATENT DOCUMENTS

| 4,805,472 | A | * | 2/1989 | Aoki et al. | ..................... 74/335 |
| 4,862,989 | A | * | 9/1989 | Kano et al. | ................. 180/247 |
| 6,315,073 | B1 | * | 11/2001 | Nonaka | ....................... 180/247 |

FOREIGN PATENT DOCUMENTS

| JP | 07179138 A | * | 7/1995 |
| JP | 2003-336717 | | 11/2003 |
| JP | 2003324895 A | * | 11/2003 |
| JP | 3521945 | | 2/2004 |

* cited by examiner

Primary Examiner—Richard W L Ridley
Assistant Examiner—Alan B Waits
(74) Attorney, Agent, or Firm—Buchanan Ingersoll & Rooney PC

(57) ABSTRACT

An actuator includes a motor, an input rotation member driven by the motor, an input contacting portion formed on the input rotation member, a bush disposed so as to be relatively rotatable to the input rotation member, a first contacting portion and an engaging portion formed on the bush, a spiral spring including an outer circumferential hook portion in contact with the input contacting portion of the input rotation member, and an inner circumferential hook portion engageable with the engaging portion of the bush, the spiral spring storing a rotational force of the input rotation member as an potential energy via the input contacting portion, an output member disposed so as to be relatively rotatable to the input rotation member, an output contacting portion formed on the output member and in contact with the outer circumferential hook portion of the spiral spring; the output contacting portion transmitting the potential energy stored in the spiral spring to the output member; wherein the bush includes a second contacting portion positioned at a predetermined angle with the first contacting portion in a rotational direction of the bush and, the second contacting portion formed so as to contact with the input rotation member and the output member during the rotation of the bush relative to the input rotation member and the output member.

14 Claims, 4 Drawing Sheets

ACTUATOR EMPLOYING A STANDBY MECHANISM

CROSS REFERENCE TO RELATED APPLICATIONS

This application is based on and claims priority under 35 U.S.C. §119 to Japanese Patent Application No. 2004-218400, filed on Jul. 27, 2004, the entire content of which is incorporated herein by reference.

FIELD OF THE INVENTION

This invention generally relates to an actuator for a vehicle. More particularly, this invention pertains to an actuator for switching between a two-wheel-drive state and a four-wheel-drive state, or between a four-wheel-drive differential free state and a four-wheel-drive differential locked state.

BACKGROUND

A known four-wheel-drive vehicle is equipped with a driving force switching device by which a two-wheel-drive state is selectable in response to a road status or a running status of a vehicle for the purposes of improving a fuel consumption, or a four-wheel-drive differential lock function is turned on for the purposes of improving a running through performance when a vehicle is running in the mud.

According to such a driving force switching device, a sleeve having a spline gear or a dog clutch arranged on a drivetrain performs a stroke operation by means of a motor-driven actuator so as to engage or disengage a driving shaft and a driven shaft with each other for the purposes of transmitting or interrupting a driving force.

A two-wheel-drive/four-wheel-drive switching device is disclosed in JP3521945B2. The two-wheel-drive/four-wheel-drive switching device is employed in an actuator that includes a spiral spring disposed between a first plate rotatable as a unit with a motor-driven gear and a second plate rotatable as a unit with an output shaft. The actuator further includes a bush member including a groove engaging with a bending inner end portion of the spiral spring and a diameter extending portion in contact with the first plate and the second plate on an outer circumferential side of the spiral spring. When the first plate rotates in one direction (i.e. clockwise direction) by means of a driving of the motor, an outer end portion of the spiral spring is pressed in the clockwise direction so that the spiral spring is wound. The rotation of the first plate then causes the second plate to rotate by means of the inner end portion of the spiral spring, the groove and the diameter extending portion of the bush member. At this time, if a shift fork for moving a sleeve is not capable of performing a stroke operation since phases of respective spline gears of a driving shaft and a driven shaft of a transfer device are not matched with each other and then the output shaft of the actuator cannot rotate, the rotation of the first plate is stored in the spiral spring as deflection energy. Further, when the first plate rotates in the other direction (i.e. counterclockwise direction) by means of a driving of the motor, the diameter extending portion of the bush member is pressed in the counterclockwise direction so that the spiral spring is wound from the inner end portion by means of the groove of the bush member engaging with the inner end portion of the spiral spring. The second plate is rotated by the outer end portion of the spiral spring accordingly. At this time, if the output shaft cannot rotate in the same way as the first plate rotating in one direction, the rotation of the first plate is stored in the spiral spring as deflection energy. That is, the actuate is equipped with a standby mechanism by which a relative rotation between the first plate and the second plate can be stored in the spiral spring as deflection until the output shaft is brought to be able to rotate. The deflection stored is released when the output shaft is able to rotate, thereby causing the sleeve to perform a stroke operation by means of the shift fork connected to the output shaft. The driving shaft and the driven shaft are connected to each other so that a switching from the two-wheel-drive state to the four-wheel-drive state or vice versa can be performed.

Further, another actuator is disclosed in JP2003-336717A. The actuator disclosed includes an input side rotating member, an output side rotating member, a spring, a first spring receiving member, and a second spring receiving member all rotatably arranged on an identical rotational center. The actuator further includes an input rotation directly transmitting portion disposed between the first spring receiving member and the second spring receiving member for directly transmitting, not via the spring, a rotational force of a driving shaft to a driven shaft by the first spring receiving member and the second spring receiving member attaching to each other when the first spring receiving member and the second spring receiving member relatively rotate to each other by a predetermined angle or more.

In order to achieve a reduction in size and weight of the actuator for the purposes of improving a mounting ability of the actuator in a vehicle, or to realize a high-power of the actuator without changing a size thereof, however, the following issues may occur.

According to the actuator disclosed in JP3521945B2, the spiral spring is disposed between the first plate and the second plate. Since a rotating torque of the first plate is always transmitted to the second plate by means of the spiral spring, a maximum output load of the actuator is equal to spring characteristics (deflection-load characteristics) of the spiral spring. Thus, the maximum output is determined on the basis of a load of the spiral spring. That is, in case of attempting a reduction in size and weight of the actuator without changing an output load of the actuator, a restriction exits on a downsizing of the entire actuator since a downsizing of the spiral spring is limited so as to maintain the output load. On the other hand, improving the output load of the actuator without changing a size thereof means increase in size of the spiral spring.

The actuator disclosed in JP2003-336717A includes as the standby mechanism the first spring receiving member, the second spring receiving member, and the input rotation directly transmitting portion for directly transmitting, not via the spring, a rotational force of the driving shaft to the driven shaft by attaching the first spring receiving member and the second spring receiving member to each other when the first spring receiving member and the second spring receiving member relatively rotate to each other by a predetermined angle or more. Then, the output load of the actuator is improved by using the output load of the motor so that a power switching operation can be surely performed.

According to the aforementioned standby mechanism, however, the input side rotation member and the spring receiving member are formed separately, and then the input rotation directly transmitting portion is formed as a fan-shaped projection in an axial direction of the spring receiving member. The standby mechanism has a certain degree of thickness in the axial direction and consists of a combination of great number of parts. That is, the actuator includes a great number of components and is large in size in the rotational axis direction.

Thus, a need exists for an actuator which can provide an increased maximum output load and improve certainty of switching of driving force while achieving an entire reduction in size and weight with avoiding a complexity of structure.

SUMMARY OF THE INVENTION

According to an aspect of the present invention, an actuator includes a motor, an input rotation member driven by the motor, an input contacting portion formed on the input rotation member, a bush disposed so as to be relatively rotatable to the input rotation member, a first contacting portion and an engaging portion formed on the bush, a spiral spring including an outer circumferential hook portion in contact with the input contacting portion of the input rotation member, and an inner circumferential hook portion engageable with the engaging portion of the bush, the spiral spring storing a rotational force of the input rotation member as an potential energy via the input contacting portion, an output member disposed so as to be relatively rotatable to the input rotation member, and an output contacting portion formed on the output member and in contact with the outer circumferential hook portion of the spiral spring, the output contacting portion transmitting the potential energy stored in the spiral spring to the output member; wherein the bush includes a second contacting portion positioned at a predetermined angle with the first contacting portion in a rotational direction of the bush and, the second contacting portion formed so as to contact with the input rotation member and the output member during the rotation of the bush relative to the input rotation member and the output member.

According to another aspect of the present invention, an actuator includes a motor, a worm wheel driven by the motor, an input contacting portion formed on an input plate attached to the worm wheel, a bush disposed so as to be relatively rotatable to the worm wheel, a first contacting portion and an inner circumferential engaging portion formed on the bush, a spiral spring including an outer circumferential hook portion in contact with the input contacting portion of the worm wheel, and an inner circumferential hook portion engageable with the engaging portion of the bush, an output gear disposed so as to be relatively rotatable to the worm wheel, and, an output contacting portion formed on an output plate attached to the output gear and in contact with the outer circumferential hook portion of the spiral spring; wherein the bush includes a second contacting portion forming a predetermined angle with the first contacting portion in a rotational direction of the bush.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
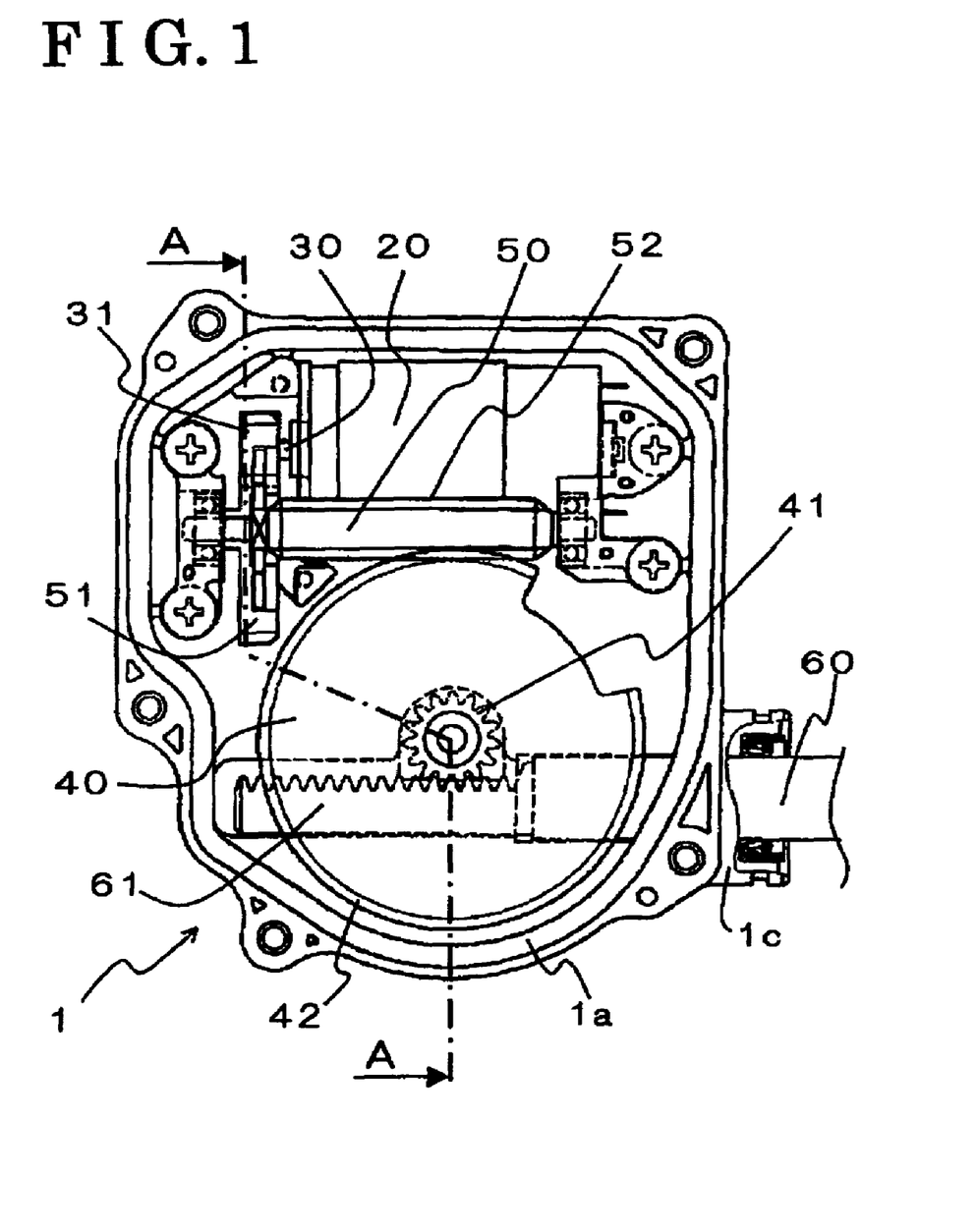
FIG. 1 is a side view of an actuator according to an embodiment of the present invention.

An embodiment of the present invention is explained with reference to the attached drawings. FIG. 1 is a side view of an actuator 1 according to the present embodiment. The actuator 1 includes a housing 1a having a bottom portion and supporting a motor 20. In addition, in the housing 1a, a deceleration shaft 50 is rotatably supported, and a worm wheel (input rotation member) 40 and an output gear (output member) 41 are rotatably supported in a direction perpendicular to the deceleration shaft 50. The housing 1a includes an opening portion 1c in which an output rod 60 is slidably accommodated in an axial direction thereof.

A motor gear 31 fixed to a motor shaft 30 of the motor 20 engages with a deceleration gear 51 fixed to the deceleration shaft 50. In addition, a worm gear 52 formed on a shaft portion of the deceleration shaft 50 engages with a worm wheel gear 42 formed on an outer periphery of the worm wheel 40. The worm wheel 40 is connected to the output gear 41 by means of a standby mechanism (to be explained later). The output gear 41 constitutes a rack and pinion mechanism with a rack gear portion 61 of the output rod 60.

A rotation generated by the motor 20 is decelerated through the motor shaft 30, the motor gear 31, and the deceleration gear 51, and then transmitted to the deceleration shaft 50. The rotation of the deceleration shaft 50 is further decelerated through the worm gear 52 formed on the deceleration shaft 50, and the worm wheel gear 42 of the worm wheel 40, and then converted to the rotation of the worm wheel 40. The rotation of the worm wheel 40 is transmitted to the output gear 41 by means of the standby mechanism, and converted to a linear movement in the rack and pinion mechanism, which results in a stroke operation of the output rod 60.

A function of the actuator 1 when installed in a vehicle is explained below. The actuator 1 consisting of a part of a driving force switching device of a four-wheel-drive vehicle is fixed by means of bolts to a center transfer device (not shown) arranged on a lower side of a vehicle with avoiding interference with an undercover (not shown), a muffler (not shown), a propeller shaft (not shown), and the like. The output rod 60 of the actuator 1 is connected by means of a fork (not shown) to a sleeve (not shown) having an internal spline that is capable of engaging with an external spline formed on each outer periphery of a driving shaft (not shown) and a driven shaft (not shown) in the center transfer device of a vehicle.

When a switch (not shown) in a vehicle compartment is operated and a four-wheel-drive state is selected, an ECU (not shown) outputs a command for operating the actuator 1. Then, the sleeve engaging with the driven shaft only is brought to perform a stroke operation towards the driving shaft side by the actuator 1. At this time, since a cone synchronizer mechanism (not shown) is provided between the driving shaft and the driven shaft, a torque of the driving shaft is transmitted to the driven shaft by means of friction engagement of a synchronizer cone when the sleeve presses a synchronizer ring, and then the driving shaft and the driven shaft are synchronized with each other. After synchronization of the driving shaft and the driven shaft, the sleeve further performs a stroke operation towards the driving shaft side, thereby causing the internal spline of the sleeve and the external spline of the driving shaft to engage with each other. Then, the driving shaft and the driven shaft are connected with each other to rotate as a unit. As a result, an engine torque is transmitted to front wheels and rear wheels of the vehicle so as to realize a four-wheel-drive state of the vehicle. In cases where a two-wheel-drive state is selected through a switch, the sleeve engaging with the driving shaft and the driven shaft is brought to perform a stroke operation towards the driven shaft side by the actuator 1 so that the sleeve disengages from the driving shaft. As a result, a connection between the driving shaft and the driven shaft is cancelled and thus the torque is prevented from transmitting to the driven shaft, thereby achieving the vehicle in the two-wheel-drive state.

Next, the standby mechanism of the actuator 1 is explained below. When the sleeve performs a stroke operation so that the internal spline of the sleeve and each external spline of the driving shaft and the driven shaft engage with each other for the purposes of connecting the driving shaft and the driven shaft to each other in the center transfer device and the like, phases of the internal spline of the sleeve and each external spline of the driving shaft and the driven shaft are not always matched with each other. In such circumstances, the standby mechanism provides a feature of allowing the stroke operation of the sleeve to be stopped. Further, chamfers are formed on edge portions of the respective splines of the sleeve, the driving shaft, and the driven shaft and thus each spline is tapered. The chamfers of the sleeve, and the driving shaft and the driven shaft engage with each other when force is applied to the sleeve in a stroke direction thereof. Then, the engagement proceeds gradually in the stroke direction of the sleeve, thereby causing the phases of the spline, and the driving shaft and the driven shaft to be matched with each other. When the splines of the sleeve and the driven shaft completely engage with each other, the connection between the driving shaft and the driven shaft is completed. At this time, the standby mechanism provides a feature of generating a thrust for advancing the sleeve in the stroke direction. Accordingly, the standby mechanism is provided for bringing a sleeve, a dog clutch, or the like to perform a stroke operation and then stopping the stroke operation thereof until the phases of the driving shaft and the driven shaft are matched with each other, and at the same time maintaining the thrust of the stroke.

Figure 2:
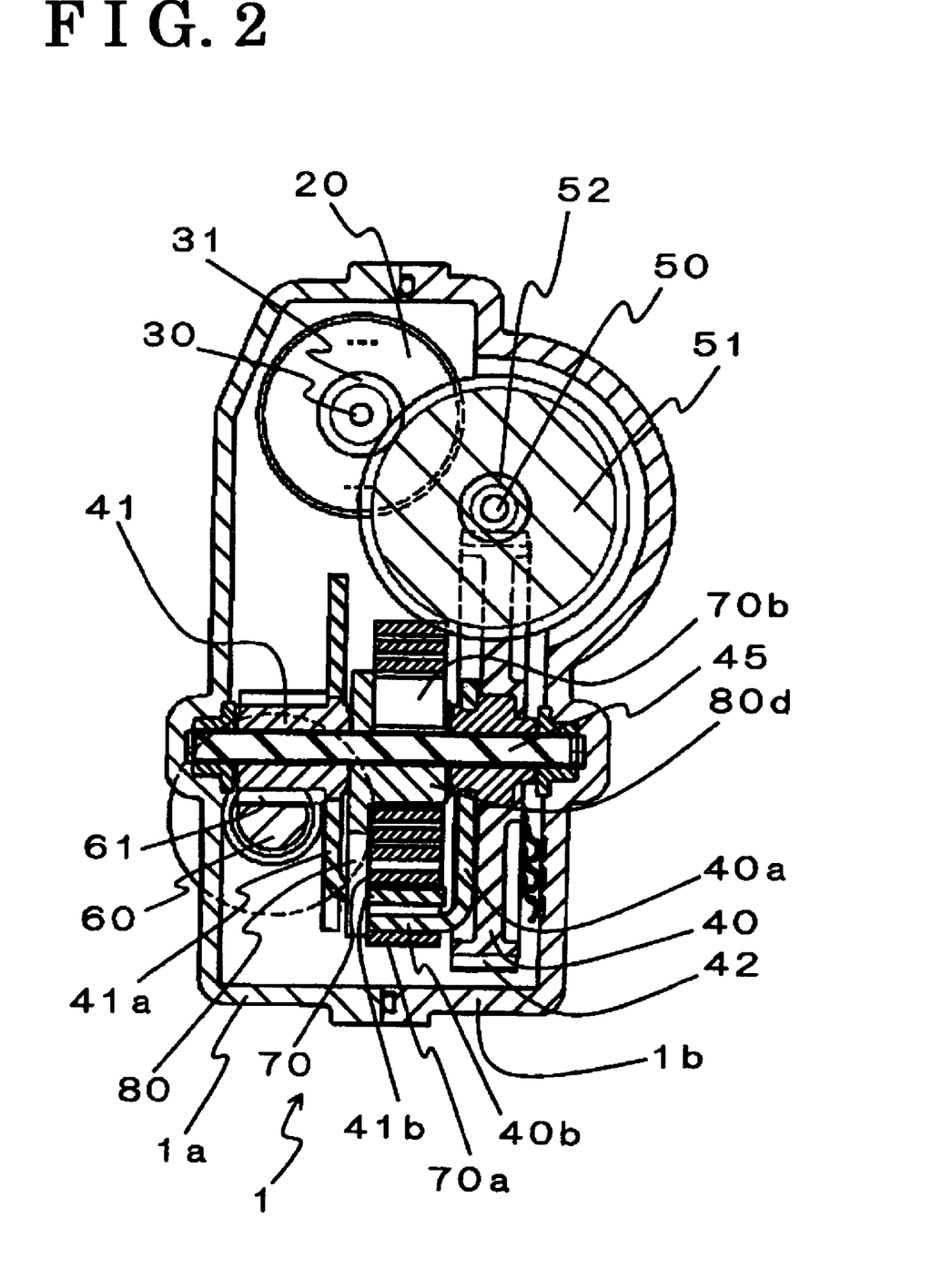
FIG. 2 is a front cross-sectional view taken along the line A-A in FIG. 1.

FIG. 2 is a cross-sectional view taken along the line A-A in FIG. 1 and viewed from an arrow direction in FIG. 1. The worm wheel 40 and the output gear 41 are coaxially and relatively rotatable to each other by means of a shaft 45 extending through the worm wheel 40 and the output gear 41. The shaft 45 is rotatably supported by the housing 1*a* and a cover 1*b*. An input plate 40*a* formed by a plate is riveted to the worm wheel 40 while an output plate 41*a* formed by a plate is riveted to the output gear 41. The input plate 40*a* and the output plate 41*a* respectively include an input contacting portion 40*b* and an output contacting portion 41*b* bending towards each other and in contact with an outer circumferential hook portion 70*a* of a spiral spring 70 disposed between the input plate 40*a* and the output plate 41*a* in such a manner that the spiral spring 70 is relatively rotatable to the input plate 40*a* and the output plate 41*a*. Further, a bush 80 is disposed between the output plate 41*a* and the spiral spring 70 in such a manner that the bush 80 is coaxial and relatively slidable to the output gear 41.

Figure 3:
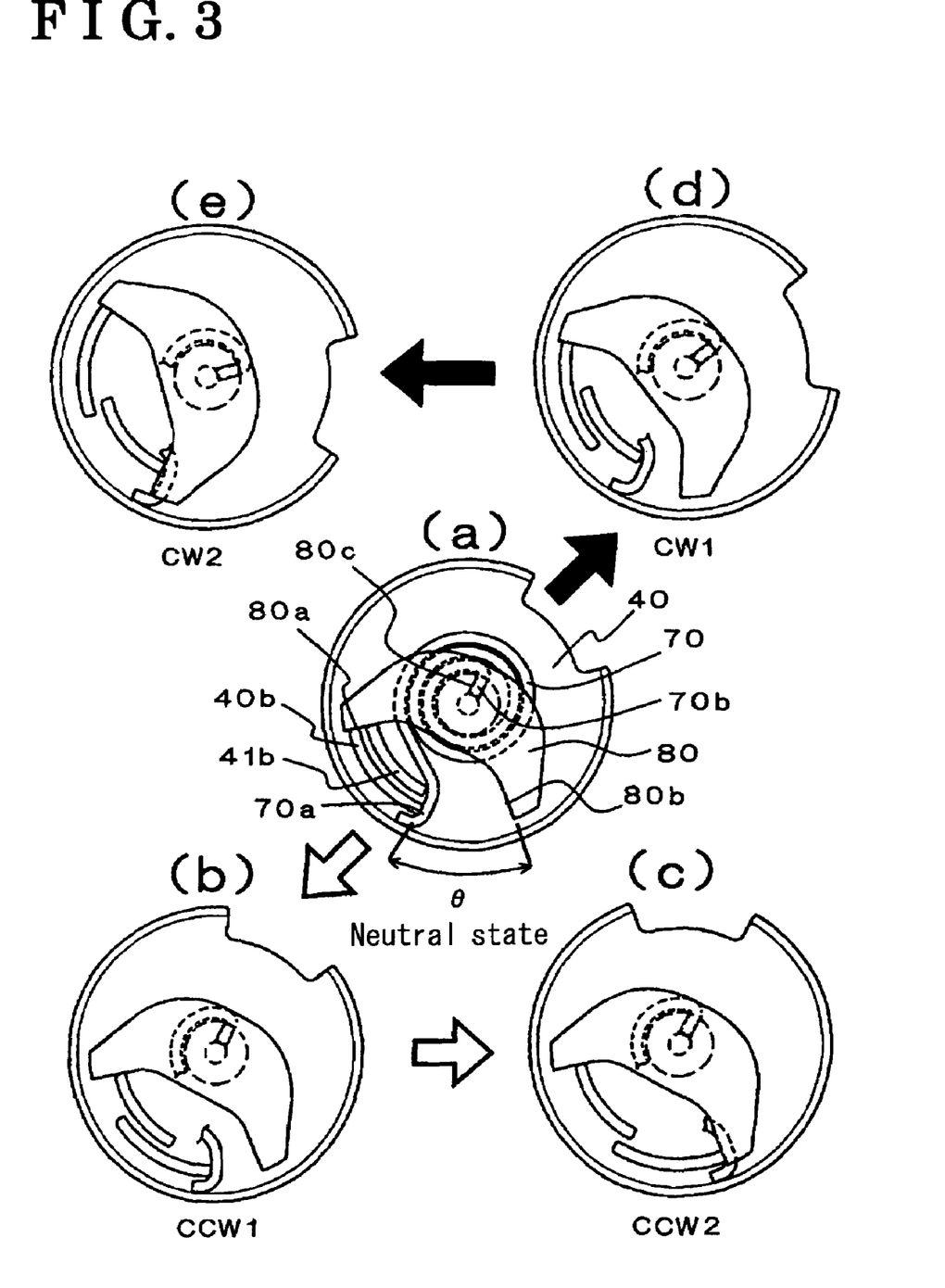
FIG. 3 is a view showing a structure of a standby mechanism of the actuator according to the embodiment of the present invention.

FIG. 3 is a side view of the standby mechanism taken from the actuator 1 in FIG. 2 and viewed from the right for showing a structure and an operation of the standby mechanism. FIG. 3(*a*) shows a contacting relationship among members in the standby mechanism as in a neutral state in which a relative rotational difference is not present between the input contacting portion 40*b* and the output contacting portion 41*b*.

The spiral spring 70 is formed by being wound from spring steel, whose cross section is in a rectangular shape, in a spiral manner. An outer circumferential hook portion 70*a* is formed on an outer end portion of the spiral spring 70 by being bent in an opposite direction to the winding direction, while an inner circumferential hook portion 70*b* is formed on an inner end portion of the spiral spring 70 by being bent towards a center of winding portion.

An engaging portion 80*c* having a groove shape is formed on a boss portion 80*d*, which is molded by sintering, provided at a center of the bush 80. The inner circumferential hook portion 70*b* is positioned within the engaging portion 80*c* so as to engage therewith. When the bush 80 rotates, that rotation is transmitted to the inner circumferential hook portion 70*b* of the spiral spring 70, thereby rotating the spiral spring 70. Further, the bush 80 includes a first contacting portion 80*a* and the second contacting portion 80*b* both extending in a radial direction. The first contacting portion 80*a* and the second contacting portion 80*b* each form a predetermined angle relative to a rotational axis.

The outer circumferential hook portion 70*a* of the spiral spring 70 and the first contacting portion 80*a* of the bush 80 are in contact with or adjacent to each other in the rotational direction while the input contacting portion 40*b* and the output contacting portion 41*b* are sandwiched between the outer circumferential hook portion 70*a* and the first contacting portion 80*a*. The input contacting portion 40*b* is positioned on an outer circumferential side of the output contacting portion 41*b*. A bending side of the input contacting portion 40*b* is in contact with the outer circumferential hook portion 70*a* of the spiral spring 70 while a tip end side of the input contacting portion 40*b* is in contact with the first contacting portion 80*a* of the bush 80. In addition, a bending side of the output contacting portion 41*b* is in contact with the first contacting portion 80*a* of the bush 80 while a tip end side of the output contacting portion 41*b* is in contact with the outer circumferential hook portion 70*a* of the spiral spring 70. Accordingly, the input contacting portion 40*b*, the output contacting portion 41*b*, the spiral spring 70, and the bush 80 are constituted to be in contact with one another.

When the worm wheel 40 rotates in one direction (i.e. counterclockwise direction in FIG. 3), the input contacting portion 40*b* of the input plate 40*a* integrally formed with the worm wheel 40 rotates in the counterclockwise direction as shown in FIGS. 3(*b*) and (*c*). At this time, the input contacting portion 40*b* winds the spiral spring 70 from an outer circumferential side thereof. Then, the inner circumferential hook portion 70*b* rotates the bush 80 in the counterclockwise direction by means of the engaging portion 80*c* of the bush 80. As a result, the first contacting portion 80*a* rotates the output contacting portion 41*b* in the counterclockwise direction, thereby causing the output gear 41 integrally formed with the output plate 41*a* to rotate. Next, when the worm wheel 40 rotates in the other direction (i.e. clockwise direction in FIG. 3), the input contacting portion 40*b* of the input plate 40*a* integrally formed with the worm wheel 40 rotates in the clockwise direction as shown in FIGS. 3(*d*) and (*e*). At this time, the input contacting portion 40*b* presses the first contacting portion 80*a* of the bush 80 so as to rotate the bush 80 in the clockwise direction. The engaging portion 80*c* of the bush 80 winds the inner circumferential hook portion 70*b* of the spiral spring 70 in the clockwise direction from the rotational center side. The outer circumferential hook portion 70*a* rotates the output contacting portion 41*b* in the clockwise direction, thereby rotating the output gear 41 integrally formed with the output plate 41*a*. As shown in FIG. 1, the output gear 41 engages with the rack gear portion 61 of the output rod 60 by means of the rack and pinion mechanism. Thus, when the worm wheel 40 rotates in the counterclockwise direction, the output rod 60 performs a stroke operation in the rightward direction in FIG. 1 so as to extend, and also performs a stroke operation in the leftward direction in FIG. 1 so as to be shorten when the worm wheel 40 rotates in the clockwise direction.

In the basic state as shown in FIG. 3(a), the input contacting portion 40b and the output contacting portion 41b each have a predetermined width (or length) in a rotational direction. The input contacting portion 40b and the output contacting portion 41b are in contact with or adjacent to the outer circumferential hook portion 70a of the spiral spring 70 when rotating in the counterclockwise direction. Meanwhile, the input contacting portion 40b and the output contacting portion 41b are in contact with or adjacent to the first contacting portion 80a of the bush 80 when rotating in the clockwise direction. Each width of the input contacting portion 40b and the output contacting portion 41b is specified on the basis of each torque transmitted by the input contacting portion 40b and the output contacting portion 41b so that the strength thereof may be assured. Further, the input contacting portion 40b is positioned on an outer circumferential side of the output contacting portion 41b and has a greater width in a rotational direction than that of the output contacting portion 41b. In such circumstances, the outer circumferential hook portion 70a and the inner circumferential hook portion 70b of the spiral spring 70 are assembled in a state in which a torque is applied to the spiral spring 70 and thus the spiral spring 70 is bent by a predetermined amount as compared to a case in which no torque is applied to the spiral spring 70. The outer circumferential hook portion 70a and the inner circumferential hook portion 70b therein sandwich the input contacting portion 40b and the output contacting portion 41b.

Figure 4:
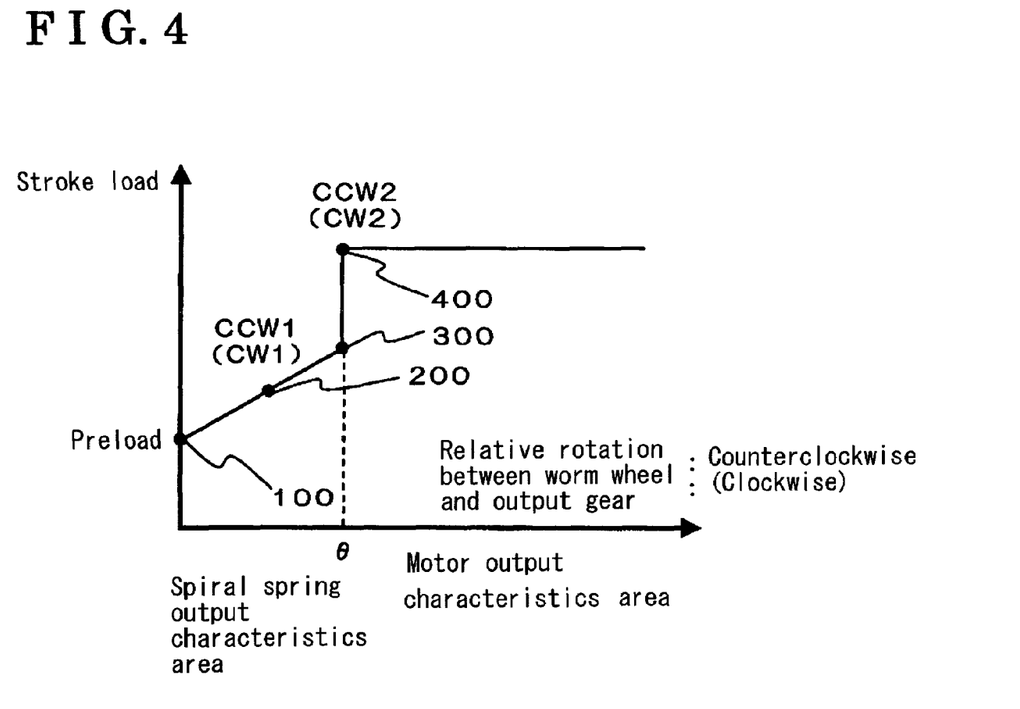
FIG. 4 is a view showing output characteristics of the actuator according to the embodiment of the present invention.

A relationship between an operation of the actuator 1 and a load output from the actuator 1 is explained with reference to FIGS. 3 and 4. FIG. 4 shows a relationship between a relative rotation between the worm wheel 40 and the output gear 41, and a stroke load of the output rod 60 of the actuator 1.

FIG. 3(a) shows a neutral position of each member (i.e. in the aforementioned basic state) in which a relative rotation is not caused from an originally assembled state between the worm wheel 40 and the output gear 41. This state corresponds to a point 100 in FIG. 4 in which a predetermined preload is generated. At this time, in a center transfer device of a vehicle, the stroke operation of the sleeve is completed in response to a rotation of the worm wheel 40. Practically, the point 100 corresponds to a state in which the spline phases of the driving shaft and the driven shaft in the center transfer device are matched with each other and the sleeve is just performing the stroke operation or has completed the stroke operation at its end portion, the sleeve engages with only the spline of the driven shaft, and the like. The stroke load generated at the instant of the sleeve performing the stroke operation as the spline phases of the driving shaft and the driven shaft are matched with each other is equal to or less than a load indicated by the point 100 as the predetermined preload.

Next, a relationship between an operation of the standby mechanism and a stroke load output from the actuator 1 in a following state is explained below. That is, the four-wheel-drive state is selected from the two-wheel-drive state through a switch in the vehicle compartment while the spline phases of the driving shaft and the driven shaft in the center transfer device are not matched with each other, and then the motor 20 of the actuator 1 is driven to rotate the worm wheel 40 but the sleeve cannot perform the stroke operation and thus the output gear 41 is prevented from rotating.

When the four-wheel-drive state is selected through the switch, the sleeve engaging with the driven shaft only in the center transfer device attempts to perform a stroke operation towards the driving shaft side. At this time, the motor 20 brings the worm wheel 40 to rotate in the counterclockwise direction so as to rotate the output gear 41 in the counterclockwise direction since the output rod 60 of the actuator 1 needs to extend for the stroke operation. At this time, if the phase of the spline of the driven shaft is not matched with the phase of the spline of the driving shaft, the sleeve is not capable of performing the stroke operation and thus the rotation of the output gear 41 is stopped. A relative rotation is generated between the worm wheel 40 and the output gear 41 while the spiral spring 70 is compressed.

FIG. 3(b) shows an operation of the standby mechanism when the worm wheel 40 rotates in the counterclockwise direction. Respective positions of the output contacting portion 41b and the bush 80 are not changed from those in the basic state. However, the input contacting portion 40b presses the outer circumferential hook portion 70a of the spiral spring 70 in the counterclockwise direction so as to wind the spiral spring 70. Since the inner circumferential hook portion 70b of the spiral spring 70 engages with the engaging portion 80c of the bush 80, the relative rotation between the worm wheel 40 and the output gear 41 is stored as elastic energy of the spiral spring 70. At the same time, due to restoring force of the elastic energy, the first contacting portion 80a of the bush 80 presses the output contacting portion 41b and then a torque corresponding to the elastic energy is transmitted to the output gear 41, thereby generating the stroke load in the output rod 60. An inclining portion represented by a point 200 in FIG. 4 corresponds to a state in which the relative rotation occurs between the worm wheel 40 and the output gear 41 in the standby mechanism. It is indicated that if the output rod 60 cannot perform a stroke operation even if the worm wheel 40 further rotates in the counterclockwise direction, a deflection amount of the spiral spring 70 is increased and also the stroke load of the output rod 60 is increased. In cases where the phase of the spline of the driven shaft and that of the driving shaft cannot be synchronized or matched with each other even if the stroke load of the output load 60 is increased in response to the increase of the deflection of the spiral spring 70, further difference in the relative rotation is caused between the worm wheel 40 and the output gear 41.

As shown in FIG. 3(c), if the difference in the relative rotation between the worm wheel 40 and the output gear 41 reaches a predetermined counterclockwise rotational angle θ, a portion of the input contacting portion 40b on the counterclockwise rotation side is made contact with the second contacting portion 80b of the bush 80. The rotating torque of the worm wheel 40 is directly transmitted to the output gear 41, thereby significantly increasing the stroke load of the output rod 60. This state corresponds to a change from a point 300 to a point 400 in FIG. 4. Between the point 100 and the point 300 as of the stroke load of the output rod 60, the output load of the actuator 1 depends on the deflection energy of the spiral spring 70 while the output load of the actuator 1 depends on an output and a (constant) deceleration ratio of the motor 20 after the point 400 (i.e. motor characteristics 500). The predetermined counterclockwise rotational angle θ is specified by subtracting an angle occupied by the width of the input contacting portion 40b from a predetermined angle formed between the first contacting portion 80a and the second contacting portion 80b relative to the rotational axis.

By providing the second contacting portion 80b on the bush 80, the torque is directly transmitted from the worm wheel 40 to the output gear 41. Thus, the stroke load of the output rod 60 may be specified at a large level on the basis of the output of the motor 20 instead of only depending on the restoring force of the spiral spring 70. That is, the output level of the actuator 1 may be increased without increasing a size of the spiral spring 70. Further, since the motor characteristics 500 is specified as a sufficient stroke load for synchronizing or matching the rotation and spline phases of the driving shaft and the driven shaft in the center transfer device, when the relative rotation between the worm wheel 40 and the output gear 41 is generated up to the point 400 in FIG. 4, soon after the spline of the sleeve and each spline of each shaft engages with each other, thereby bringing a vehicle in the four-wheel-drive state.

FIG. 3(d) shows an operation of the standby mechanism when the worm wheel 40 rotates in the clockwise direction. In the center transfer device, the sleeve engaging with the splines of the driving shaft and the driven shaft is pulled towards the driven shaft side. In this case, if an internal circulating torque is generated, a differential force of each shaft is applied to the sleeve, thereby preventing the sleeve from moving. Therefore, a certain amount of stroke load is required for the output road 60 of the actuator 1 to perform a stroke operation.

When the two-wheel-drive state is selected through a switch in the vehicle compartment, the worm wheel 40 rotates in the clockwise direction so as to pull the sleeve from the driving shaft and the driven shaft. The input contacting portion 40b presses the first contacting portion 80a of the bush 80 accordingly. When the bush 80 rotates in the clockwise direction and a rotational angle between the worm wheel 40 and the output gear 41 reaches a predetermined clockwise rotational angle θ, the rotating torque of the worm wheel 40 is directly transmitted to the output contacting portion 41b as shown in FIG. 3(e) when the second contacting portion 80b is made contact with a portion of the output contacting portion 41b on the clockwise rotation side. In the same manner as the counterclockwise rotation of the worm wheel 40, FIG. 3(d) corresponds to a state from the point 100 to the point 300 in the FIG. 4. FIG. 3(e) corresponds to a state of the point 400 in FIG. 4. The predetermined clockwise rotational angle θ is specified by subtracting an angle occupied by the width of the input contacting portion 40b from a predetermined angle formed between the first contacting portion 80a and the second contacting portion 80b relative to the rotational axis.

The vehicle is brought to the two-wheel-drive state by the clockwise rotation of the worm wheel 40 accordingly.

According to the aforementioned embodiment, the center transfer device of the four-wheel-drive vehicle is explained as an example of the driving force switching device. Instead, the present embodiment may be employed in an actuator for a differential device for controlling a distribution of a driving force to front wheels and rear wheels of a vehicle, a free hub device, and the like.

Further, according to the aforementioned embodiment, the standby mechanism of the actuator 1 includes the input contacting portion 40b and the output contacting portion 41b bending to each other, the spiral spring 70 disposed therebetween, and the bush 80, all of which are constituted to be in contact with one another on the outer circumferential side of the spiral spring 70. Thus, a size in an axial direction of the actuator 1 may be reduced.

Furthermore, according to the aforementioned embodiment, the second contacting portion 80b is provided in a position in which the second contacting portion 80b forms a predetermined angle with the first contacting portion 80a relative to the rotational axis. Thus, in case of the worm wheel 40 rotating in the one direction (i.e. counterclockwise direction in FIG. 3), the input contacting portion 40b presses the outer circumferential hook portion 70a of the spiral spring 70 and rotate as a unit therewith by a predetermined amount. Afterwards, the input contacting portion 40b is made contact with the second contacting portion 80b so as to rotate as a unit with the bush 80. Accordingly, in a subsequent rotation, the rotating torque of the worm wheel 40 driven by the motor 20 is directly transmitted to the output contacting portion 41b formed on the output gear 41. Since the rotating torque from the motor 20 is transmitted not via the spiral spring 70, the motor 20 may transmit the rotating torque generating in the worm wheel 40 to the output gear 41 without decreasing a level of the rotating torque. As a result, an output of the actuator 1 may be maximized.

Furthermore, according to the aforementioned embodiment, in case of the worm wheel 40 rotating in the other direction (i.e. clockwise direction in FIG. 3), the second contacting portion 80b is made contact with the output contacting portion 41b after the input contacting portion 40b and the first contacting portion 80a are made contact with each other and rotate as a unit by a predetermined amount. Thus, in a subsequent rotation, the rotating torque of the worm wheel 40 driven by the motor 20 is directly transmitted to the output contacting portion 41b formed on the output gear 41.

Furthermore, according to the aforementioned embodiment, since the standby mechanism includes the spiral spring 70, even if a significant change in a rotation of the driving shaft or the driven shaft occurs relative to the stroke of the sleeve and thus a significant load in an opposite direction is caused at the instant of a connection between the driving shaft and the driven shaft (i.e. at the instant of the sleeve engaging with the spline of one of the shaft) after the actuator is operated to cause the sleeve to perform a stroke operation, a shock of the significant load in the opposite direction may be absorbed by the spiral spring 70, thereby preventing breakage of the motor 20 or each member.

Furthermore, according to the aforementioned embodiment, by providing the spiral spring 70, the preload may be secured at a stroke end portion of the actuator 1 in the stroke direction. At the same time, in cases where the driving force switching device of a vehicle is equipped with a cone synchronizer mechanism for synchronizing the driving shaft and the driven shaft, a restoring force of the spiral spring 70 is applied when the driving shaft engages with the spline after the sleeve presses the synchronizer ring so as to synchronize each shaft from the driving shaft wide for connection. Thus, a quick stroke operation of the sleeve is available, thereby improving the certainty of engagement between the spline of the gear of the driven shaft and the spline of the sleeve.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An actuator comprising
   a motor;
   an input rotation member driven by the motor;
   an input contacting portion formed on the input rotation member;
   a bush rotatably disposed relative to the input rotation member and having an engaging portion;
   the bush possessing an outwardly extending first contacting portion;

a spiral spring including an outer circumferential hook portion in contact with a first side surface of the input contacting portion of the input rotation member, and an inner circumferential hook portion engaging the engaging portion of the bush, the spiral spring storing a rotational force of the input rotation member as potential energy via the input contacting portion, the input contacting portion possessing a second side surface on a side of the input contacting portion opposite the first side surface;

an output member rotatably disposed relative to the input rotation member;

an output contacting portion formed on the output member and in contact with the outer circumferential hook portion of the spiral spring when the input contacting member and the output contacting member are in a neutral state;

the output contacting portion transmitting the potential energy stored in the spiral spring to the output member;

the bush possessing an outwardly extending second contacting portion which is spaced from the outwardly extending first contacting portion so that a space exists between the outwardly extending first contacting portion and the outwardly extending second contacting portion, the input contacting portion and the output contacting portion being positioned in the space, the second side surface of the input contacting portion being spaced from the outwardly extending second contacting portion by a predetermined rotational angle of less than 180° measured in a rotational direction;

the input contacting member being rotated in said rotational direction relative to the output member by operation of the motor so that when a difference in relative rotation between the input rotation member and the output member reaches the predetermined rotational angle, the second side surface of the input contacting portion contacts the outwardly extending second contacting portion so continued rotation of the input rotation member in said rotational direction is directly transmitted to the output member.

2. An actuator according to the claim 1, wherein the input rotation member is positionable in a neutral rotation position relative to the output member, in which one rotation side of the input contacting portion and the output contacting portion are in contact with, or adjacent to, the outer circumferential hook portion of the spiral spring, and an other rotation side of the input contacting portion and the output contacting portion are in contact with, or adjacent to, the first contacting portion of the bush, when the input rotation member rotates in one direction, the input contacting portion rotates together with the outer circumferential hook portion of the spiral spring by contact with the outer circumferential hook portion of the spiral spring on the one rotation side of the input rotation member, and, in a state in which a rotation position of the input rotation member in the one direction relative to the output member reaches a second predetermined angle, the bush starts to rotate together with the output member by contact between the second contacting portion of the bush and the input rotation member, and when the input rotation member rotates in an other direction, the input contacting portion rotates together with the first contacting portion of the bush by contact with the first contacting portion of the bush on the other rotation side of the input rotation member, and, in a state in which a rotation position of the input rotation member in the other direction relative to the output member reaches the second predetermined angle, the bush starts to rotate together with the output member by contact between the output member and the second contacting portion of the bush.

3. An actuator according to claim 1, wherein the input contacting portion formed on the input rotation member and the output contacting portion formed on the output member are in contact with the outer circumferential hook portion in an outer circumferential portion of the spiral spring.

4. An actuator according to claim 1, wherein the spiral spring is formed from spring steel having a rectangular shape in a cross section and wound in a winding direction, and the spiral spring includes the outer circumferential hook portion formed by being bent, at an outer end portion, in an opposite direction to the winding direction, and the inner circumferential hook portion formed by being bent, at an inner end portion, to a center of the winding direction.

5. An actuator according to claim 4, wherein the bush includes the engaging portion having a groove shape at a boss portion provided at a center of the bush, the first contacting portion extending in a radial direction, and the second contacting portion formed in a position in which the second contacting portion forms the predetermined rotational angle with the first contacting portion in a rotational direction of the bush.

6. An actuator according to claim 1, wherein the first contacting portion and the second contacting portion both extend in a radial direction.

7. An actuator according to claim 1, wherein the outer circumferential hook portion and the first contacting portion are in contact with or adjacent to each other in the rotational direction while the input contacting portion and the output contacting portion are sandwiched between the outer circumferential hook portion and the first contacting portion in a neutral state in which a relative rotational difference is not present between the input contacting portion and the output contacting portion.

8. An actuator according to claim 1, wherein the spiral spring is disposed between the input rotation member and the output member.

9. An actuator according to claim 1, wherein the spiral spring is disposed between the bush and one of the input rotation member and the output member.

10. An actuator according to claim 1, wherein the input contacting portion formed on the input rotation member and the output contacting portion formed on the output member are in contact with the outer circumferential hook portion in an outer circumferential portion of the spiral spring.

11. An actuator according to claim 1, wherein the spiral spring is formed from spring steel having a rectangular shape in a cross section and wound in a winding direction, and the spiral spring includes the outer circumferential hook portion formed by being bent, at an outer end portion, in an opposite direction to the winding direction, and the inner circumferential hook portion formed by being bent, at an inner end portion, to a center of the winding direction.

12. An actuator according to claim 11, wherein the bush includes the engaging portion having a groove shape at a boss portion provided at a center of the bush, the first contacting portion extending in a radial direction, and the second contacting portion formed in a position in which the second contacting portion forms the predetermined rotational angle with the first contacting portion in a rotational direction of the bush.

13. An actuator according to claim 1, wherein the first contacting portion and the second contacting portion both extend in a radial direction.

14. An actuator according to claim 1, wherein the outer circumferential hook portion and the first contacting portion are in contact with or adjacent to each other in the rotational direction while the input contacting portion and the output contacting portion are sandwiched between the outer circumferential hook portion and the first contacting portion in a neutral state in which a relative rotational difference is not present between the input contacting portion and the output contacting portion.

* * * * *